Figure 5:
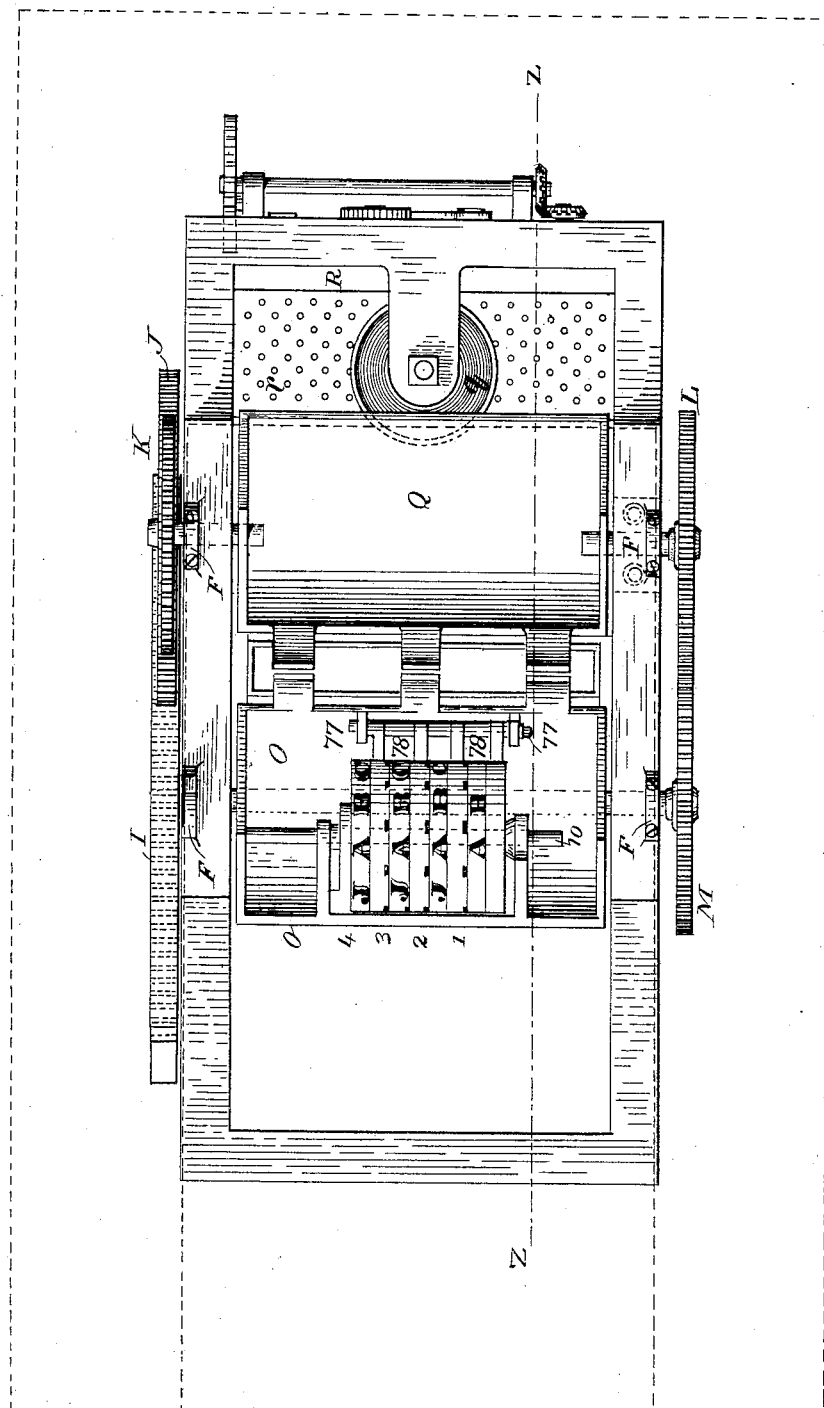

(No Model.) 5 Sheets—Sheet 1.
W. H. MUNROE & T. C. SULLIVAN.
BALLOT BOX.
No. 311,512. Patented Feb. 3, 1885.
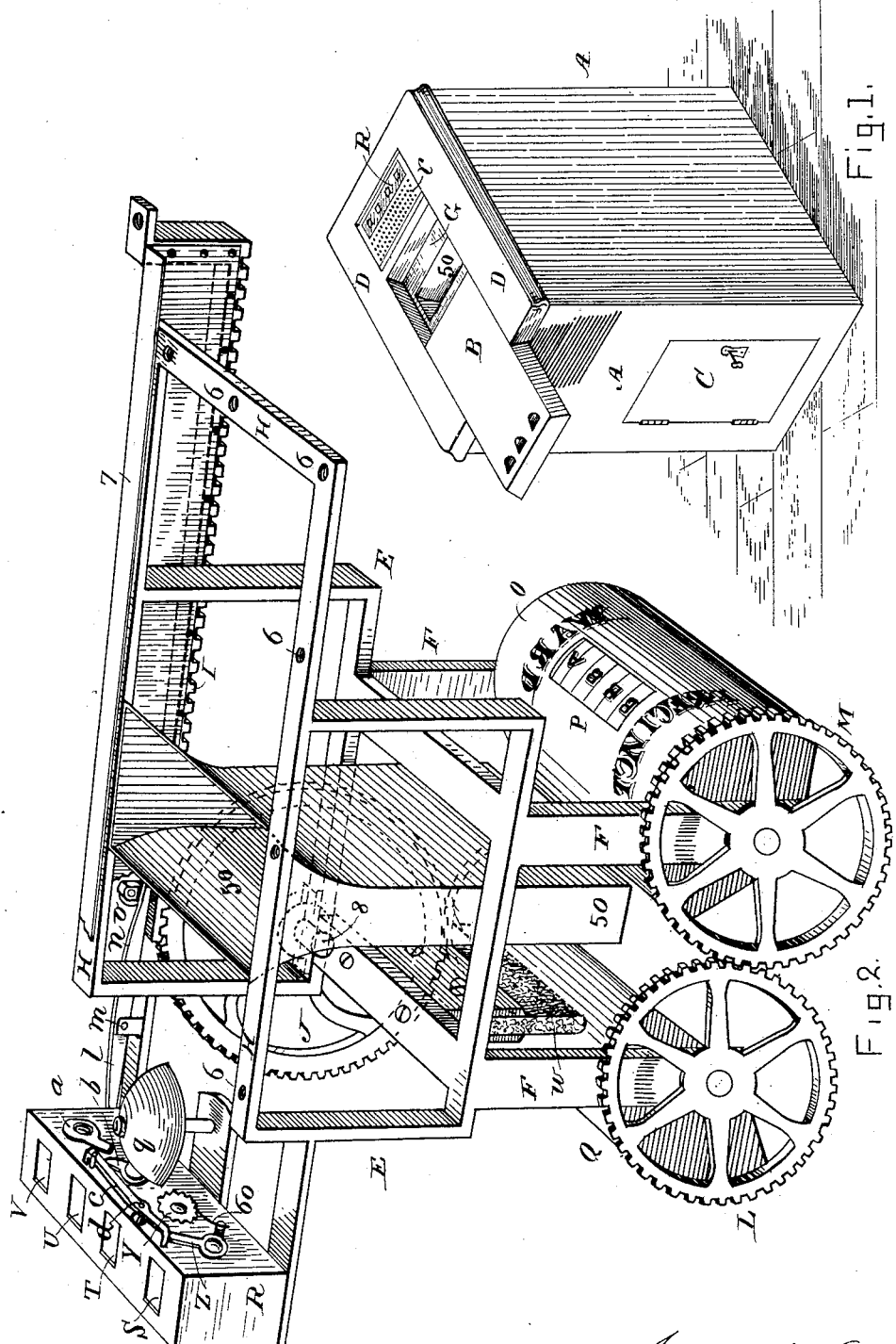

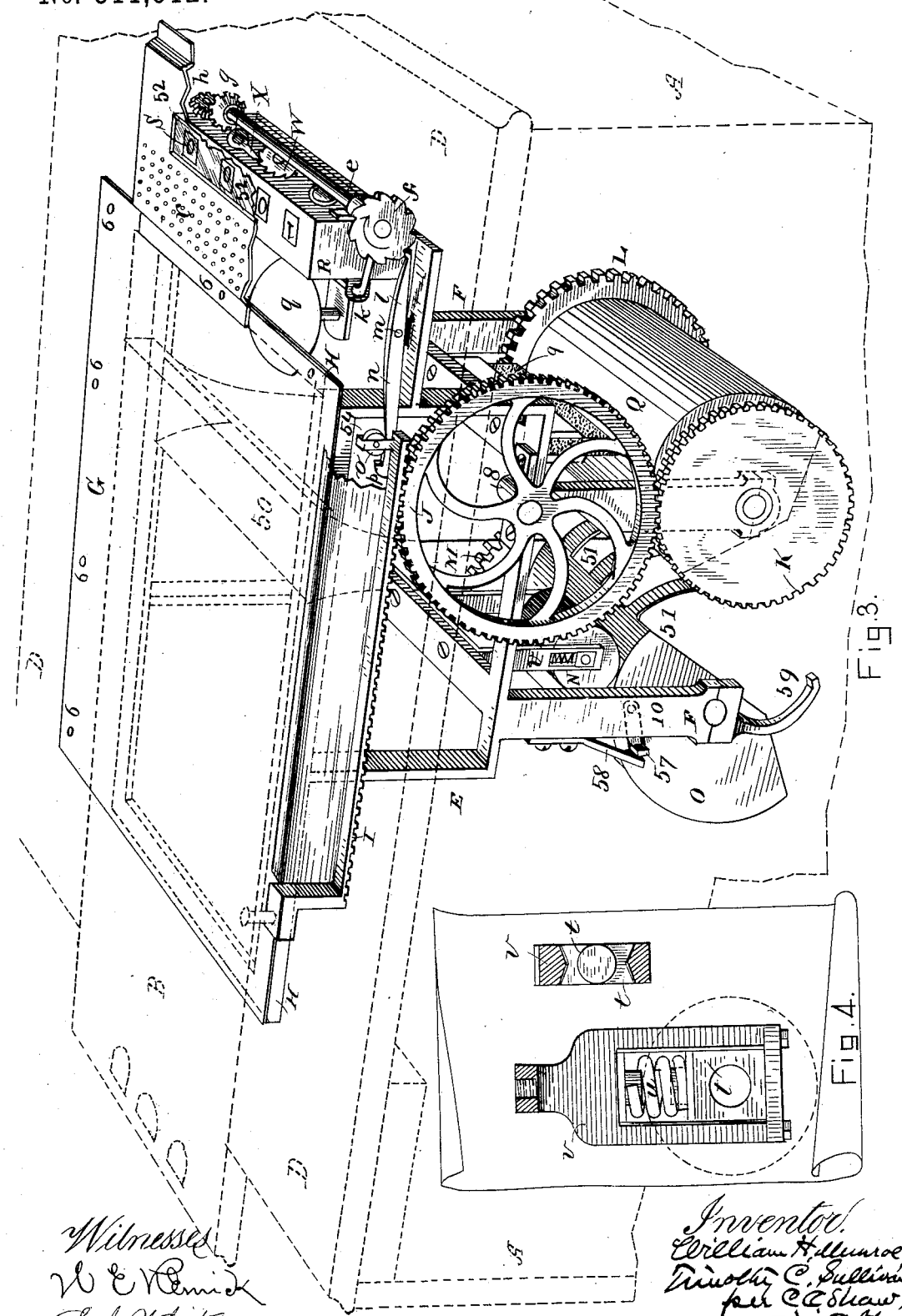

(No Model.) 5 Sheets—Sheet 3.

W. H. MUNROE & T. C. SULLIVAN.
BALLOT BOX.

No. 311,512. Patented Feb. 3, 1885.

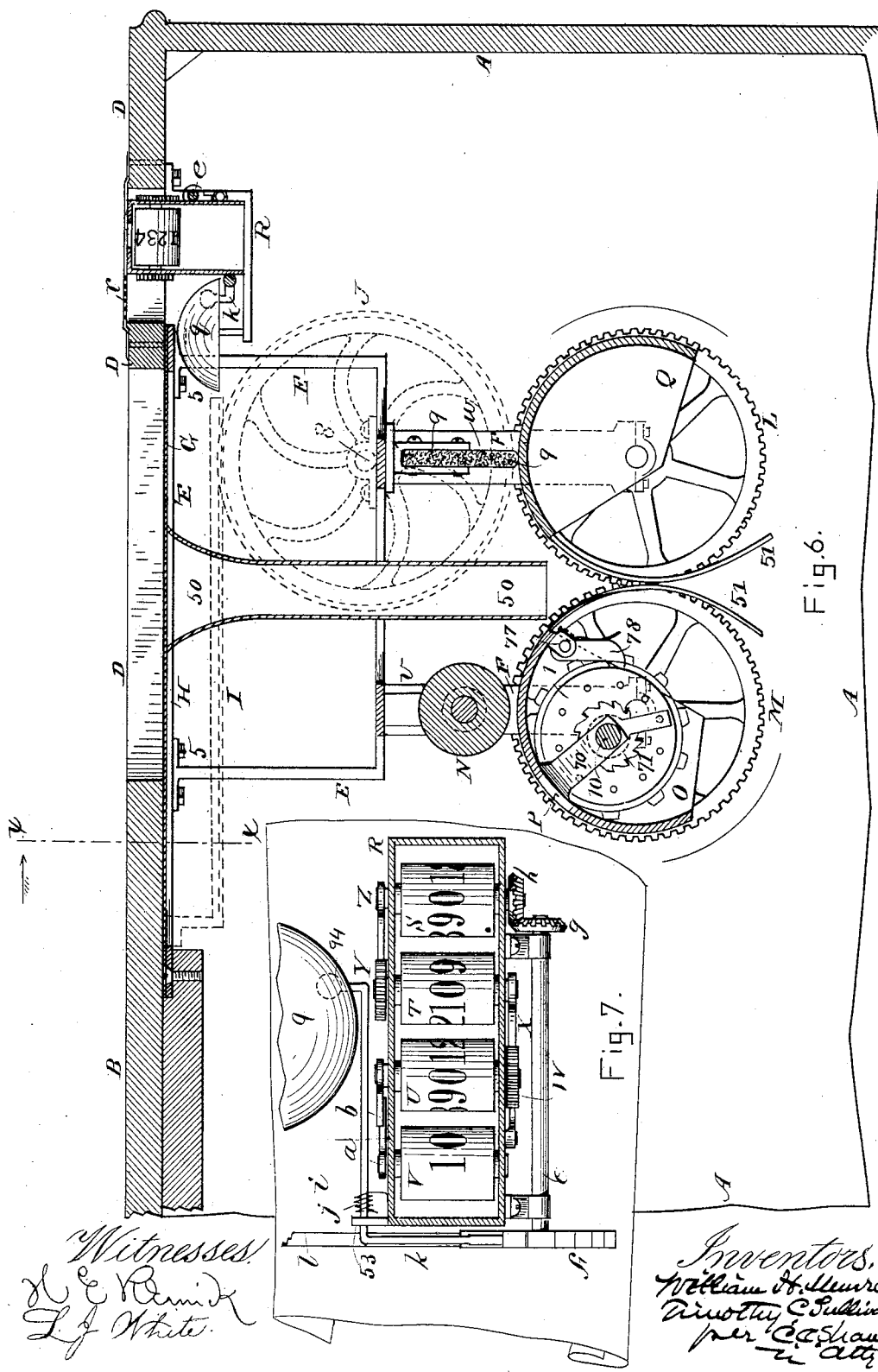

(No Model.) 5 Sheets—Sheet 5.
W. H. MUNROE & T. C. SULLIVAN.
BALLOT BOX.
No. 311,512. Patented Feb. 3, 1885.
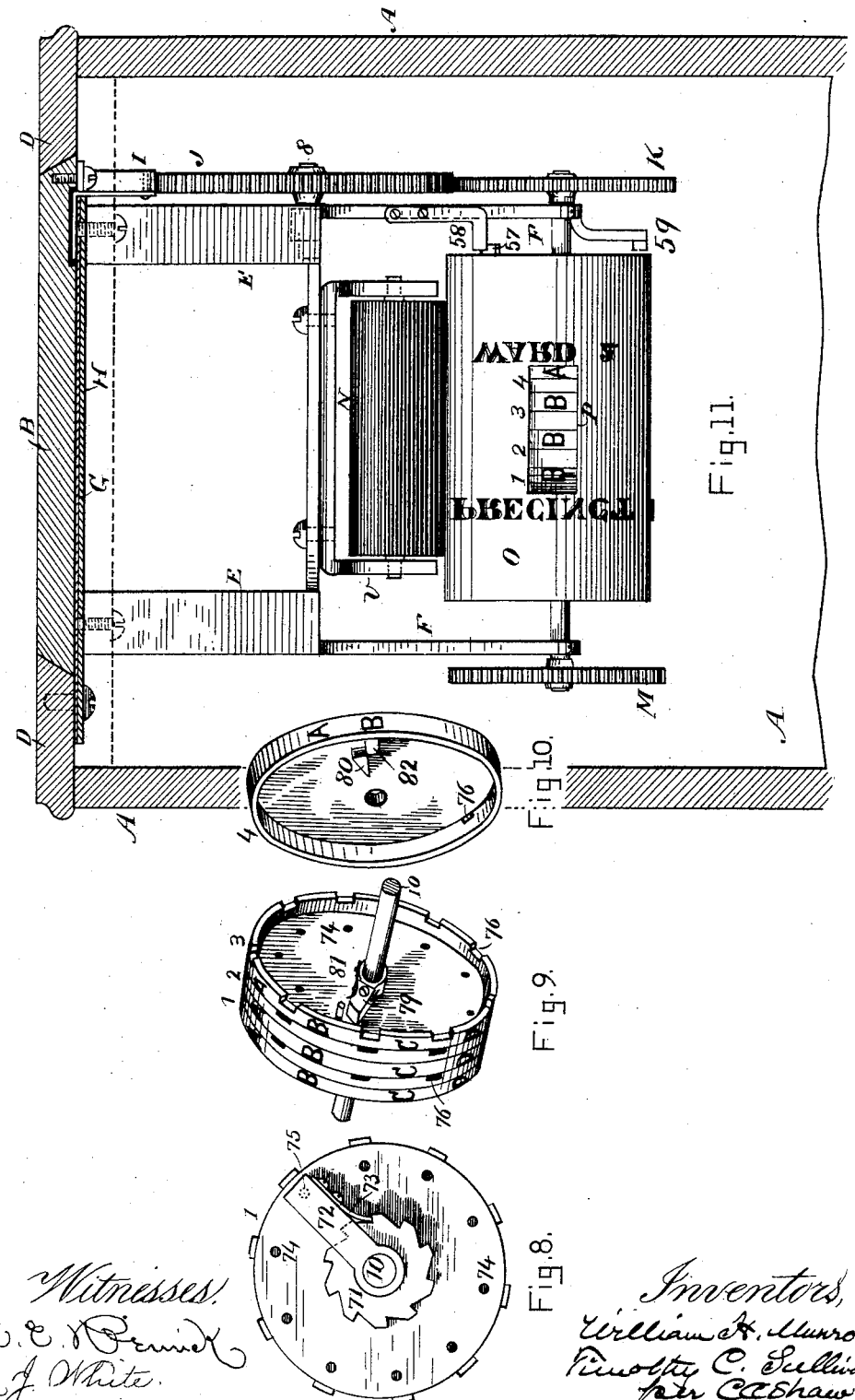

UNITED STATES PATENT OFFICE.

WILLIAM H. MUNROE AND TIMOTHY C. SULLIVAN, OF BOSTON, MASS.

BALLOT-BOX.

SPECIFICATION forming part of Letters Patent No. 311,512, dated February 3, 1885.

Application filed July 10, 1884. (No model.)

*To all whom it may concern:*

Be it known that we, WILLIAM H. MUNROE and TIMOTHY C. SULLIVAN, of Boston, in the county of Suffolk, State of Massachusetts, have invented a certain new and useful Improvement in Ballot-Boxes, of which the following is a description sufficiently full, clear, and exact to enable any person skilled in the art or science to which said invention appertains to make and use the same, reference being had to the accompanying drawings, forming a part of this specification, in which—

Figure 1 is an isometrical perspective view of our improved ballot-box in position for receiving the ballots; Fig. 2, a perspective view of the mechanism detached from the case, and with the slide or cover, ink-roll, and cap removed; Fig. 3, a like view showing the opposite side of the mechanism from that shown in Fig. 2; Fig. 4, a vertical section of one of the journals to the ink-roller; Fig. 5, a bottom plan view of the mechanism detached from the case; Fig. 6, a vertical longitudinal section taken on line z in Fig. 5; Fig. 7, a top plan view of the registering mechanism; Fig. 8, a side elevation of one of the printing-disks removed from its shaft; Fig. 9, a perspective view of the printing-disks, one being represented as removed from the shaft and shown in Fig. 10; and Fig. 11 a side elevation of the printing and ink rollers.

Like letters and figures of reference indicate corresponding parts in the different figures of the drawings.

Our invention relates more especially to that class of ballot-boxes which are provided with means for preventing fraud in voting; and it consists in a novel construction and arrangement of the parts, as hereinafter more fully set forth and claimed, by which a more effective and desirable article of this character is produced than is now in ordinary use.

The nature and operation of the improvement will be readily understood by all conversant with such matters from the following explanation:

In the drawings, A represents the body or case of the box; B, the cover or slide; C, the door through which the ballots are removed after the voting, and D the top.

Disposed within the box, beneath the top D, there is a plate, G, resting on a frame-work, E, the frame-work and plate being suspended by screws 5, which pass through holes 6 into said top.

Projecting downwardly from the frame-work E there are four arms or lugs, F, and journaled horizontally therein are two segmental rolls, O Q, arranged in parallelism with each other, as shown in Figs. 2, 3, and 5. The roll O is provided at one end with a gear, M, and the roll Q with a gear, L, which intermeshes therewith.

Secured to one side of the cover B there is a horizontally-arranged rack, I, provided with a lip or flange, 7, which overhangs the rail H, and by which it is partially supported. This rack is connected with the gear K on the roll Q by means of the intermediate gear, J, which is journaled on a stub-shaft, 8, in the upper part of the frame E, as best seen in Figs. 3 and 11.

Journaled horizontally above the roll O in lugs v there is an ink-roll, N, and disposed above the roll Q, and in contact therewith is a scraper or "wipe," 9, composed of felt or other suitable materials, and adapted to wipe the ink from said last-named roll, and thereby prevent it from blurring the tickets or ballots. The boxes t, in which the ink-roll N is journaled, are provided with springs u, to adapt them to yield vertically, as best seen in Fig. 4. The roll O is hollow, and provided with an elongated slot, P, opening through its convex side, the word "Precinct," in raised type, being disposed at one end of said slot, and the word "Ward" at the other, as shown in Figs. 2 and 11.

Journaled horizontally on the shaft 10, in proper bearings, 70, within the roll O, and with their peripheries projecting through the slot P, there are four printing-disks, 1 2 3 4, the disks 1 2 3 being provided on their peripheries with raised types, from A to J, inclusive, and the disk 4 with the raised types A B, as best seen in Figs. 9 and 10. A chute, 50, opens downwardly through the plate G, being adapted to receive the tickets or ballots and deliver them properly to the printing-rolls O Q, each of said rolls being provided with downwardly-projecting springs 51. These springs consist of long narrow strips of steel or other elastic metal, so arranged as to be in constant contact with each other as the rolls are rocked, their object being to catch the tickets or ballots as they fall from the chute 50, and properly present them to the type for printing, after the manner of the grippers of an ordinary printing-press. They also yield and permit large articles which may accidentally fall into the chute to pass the printing-rollers without injuring them, it being understood that such articles can be introduced into the box only when the cover is withdrawn and the rollers are in the position shown in Fig. 6. A box, R, is disposed in one end of the case A, which projects through an elongated slot, 52, in a foraminous plate, r, in the top D. Journaled horizontally in this box, with their shafts projecting through its sides, there are four rolls, S T U V, arranged in parallelism with each other, and respectively provided around their peripheries with numbers from 1 to 10, as best seen in Fig. 7, the rolls projecting through corresponding slots in the top of the box, as shown in Fig. 3. A shaft, e, provided at one end with a ratchet-wheel, f, and at the other with a miter-gear, g, is journaled horizontally on the side of the box R, the gear g intermeshing with a miter-gear, h, on the shaft of the roll S, the opposite end of said shaft being provided with a fixed lever or pawl, z, adapted to engage a gear or ratchet wheel, Y, on the shaft of the roll T. A fixed lever or pawl, X, is secured to that end of the shaft of the roll T which is opposite the gear Y, said lever being adapted to engage a gear or ratchet wheel, W, on the shaft of the roll U, the opposite end of said shaft being provided with a fixed pawl or lever, b, adapted to engage a like pawl or lever, a, on the shaft of the roll V. A rocker-shaft, i, is journaled in a bearing, 53, on the box R, said shaft being provided with an arm, k, adapted to engage the ratchet-wheel f, and a striker, 94, adapted to strike the bell q. A lever, l, is pivoted at m on the frame E, one end of said lever engaging the ratchet-wheel f, and the other being provided with a hook or stop, p, as seen in Fig. 3. The lever l is curved or inclined between the pivot m and stop p, as shown at n, and mounted in a bracket, o, on the inner end of the rack I, there is a friction-wheel, 54, adapted to ride up and down the incline n as the cover B is moved back and forth to open and close the box, thereby turning the wheel f, shaft e, and registering-rolls S T U V, and ringing the bell q, in a manner which will be readily obvious without a more explicit description. A horizontally-arranged lever, c, is pivoted at d to a short hub on the side of the box R, the ends of said lever being bent inwardly toward the side of the box, as seen in Fig. 2. The pawl or lever b as it rotates passes under the lever c; but the pawls or levers a z are sufficiently long to strike its inwardly-bent ends and cause it to tilt or oscillate on the pivot d. A retaining-spring, 60, adapted to press on the wheel Y, is provided to prevent the rolls in the box R from accidentally turning. The rolls S T U V are numbered and arranged to operate in the usual manner of registering-machines of this character, the roll S being designed to rotate ten times while the roll T rotates once, and the roll T ten times while the roll U rotates once, and thus on through the series, so that when figure 1 on roll V appears through its slot in the top of the box R, it indicates that roll S has been revolved one hundred times.

As the registering mechanism is designed to register but one thousand, it is important, in order to register more than that number, that when the figure 1 on the roll V is exposed, said roll should be moved back automatically one notch or figure to expose the cipher or naught, (0,) preparatory to registering another thousand, and this is accomplished by means of the lever c, as follows: When the naught or cipher on the roll V is exposed through its slot in the top of the box R, that end of the lever c which is nearest the lever z, is elevated high enough to permit the lever z to revolve freely without engaging it. At the same time the opposite end of the lever c is correspondingly depressed, and the lever a stands slightly below the lever c, but out of contact therewith.

The parts being in the position described, when the rolls have registered nine hundred and ninety-nine, and the roll V is rotated one notch or space to expose the figure 1, and thereby register one thousand, the pawl or lever a will be brought into contact with the lever c, and said lever tilted on the pivot d, thereby throwing its opposite end down into the path of the pawl or lever z, so that when the roll S makes its next revolution, or the mechanism begins to register its second thousand, the pawl or lever z will strike and pass the end of the lever c, depressing the opposite end of said last-named lever, and causing it to strike the lever or pawl a, thereby turning the roll V back one notch or space, and again exposing the naught or cipher (0) on said roll. One end of the shaft 10 extends through the end of the roll O, and is provided with a fixed arm or lever, 57, adapted to alternately strike or engage the stops 58 and 59 on the arm F, and thereby rock said shaft back and forth as the printing-rolls are reciprocated. The outer printing-disk, 1, or that nearest the end of the roll O through which the shaft 10 projects, is provided with a ratchet-wheel, 71, secured firmly to the outer side of said disk, as seen in Fig. 8, the shaft 10 being provided with a fixed arm, 72, having a spring-pawl, 73, adapted to engage said ratchet. A series of corresponding lateral holes, 74, are formed in each of the disks 1 2 3, near their peripheries, and disposed in one of these holes in disk 1 there is a short spring push-pin, 75, a corresponding push-pin (not shown) being disposed in the disk 2. Each of the disks 1 2 3 is provided with a series of notches, 76, in its rim or periphery, and pivoted on a shaft, 77, within the roll O, there are a series of spring catches or pawls, 78, adapted to fall into these notches, and prevent the disks from being accidentally turned backward on the shaft 10, but not interfering with the forward movement of said disks.

Secured to the shaft 10, between the disks 3 and 4, there is a spring lever or arm, 79, having a rule-joint, and adapted to engage a stop, 80, on the inner face of the disk 4, and projecting from the side of disk 3 there is a stud, 81, adapted to engage a stop, 82, on the inner face of disk 4.

The disks 1 2 3 4 being properly adjusted and mounted on the shaft 10, and placed in position within the roll O, are rotated or operated as follows: When the cover B is withdrawn to receive the ballot the rack I will revolve the gear J and turn the rolls O Q outwardly from the chute or hopper 50, causing the lever 57 on the shaft 10 to strike the stop 58, and turn said shaft a distance equal to one-tenth of its circumference, thereby moving the disk 1 forward by means of the pawl 73 a corresponding distance. The cover B being then pushed in to close the box the rolls O Q will be caused to partially rotate and bring the lever 57 against the stop 59, thereby turning the shaft 10 back a distance corresponding with one-tenth of its circumference, and slipping the pawl 73 over one of the teeth in the ratchet-wheel 71 preparatory to moving the disk 1 forward another step or space. After disk 1 has been intermittently moved forward or rotated, as described, a distance corresponding with nine-tenths of its circumference, the outer end of lever 72, which is inclined or beveled on its inner side for that purpose, strikes the outer end of the spring push-pin 75 and forces it through disk 1 into one of the holes 74 in disk 2. Disk 1 is then moved forward another notch or space, carrying disk 2 with it, but at the next advance of disk 1 the arm 72 is moved off the pin 75, permitting its spring (not shown) to push it outwardly and uncouple disks 1 and 2. It will be obvious that at this point disk 1 has made one and one-tenth of a revolution and disk 2 one-tenth of one revolution. Disks 1 and 2 being now uncoupled, disk 1 is intermittently advanced another revolution, and the lever 72 again overrides the spring push-pin 75, forcing it inwardly, as before, and causing it to engage disk 2, which is moved along another notch or space as before, and so on until disk 2 has been advanced nine-tenths of one revolution. The next revolution of disk 1 now brings its push-pin opposite the push-pin in disk 2, and when the lever 72 forces in the pin 75 it will also force the pin in disk 2 into one of the holes 74 in disk 3, which in its turn will now be revolved in substantially the same manner as described for disks 1 and 2. Disk 4 is not provided with a series of holes 74, nor is disk 3 provided with a spring push-pin; but when disk 3 has made nine-tenths of a revolution the stud 81 strikes the projection 82, and at the next advance of disk 3 the disk 4 is moved forward one-tenth of a revolution, exposing the letter A through the slot P and indicating that one-thousand ballots have been cast, the letters A B C, &c., on the disks 1 2 3 being used in place of the corresponding numerals, 1 2 3, &c., except on disk 4, in which the letter B indicates naught or a cipher. Disk 4 having now been moved forward to indicate one thousand, it is necessary that it should be automatically turned back one notch or space to expose the naught or letter B preparatory to commencing another thousand, and this is accomplished as follows: The jointed lever 79 on the shaft 10 at the next oscillating or rocking movement of said shaft strikes the inclined side of the projection 80 on disk 4, and passes said projection, the spring of said lever yielding to permit this, and after said lever has passed said projection the next rocking movement of shaft 10 causes the lever to strike the straight side of said projection and move disk 4 back one notch or space, thereby exposing the letter B through the slot P.

It will be understood that the disks 1 2 3 4 respectively represent units, tens, hundreds, and thousands, and that at each revolution of disk 4 disk 1 is revolved one thousand times.

In the use of our improvement the cover B is withdrawn until the wheel on the rack I strikes the stop $p$ on the lever $l$, thereby turning the rolls O Q outwardly, as shown in Fig. 6. The ballot or ticket is then dropped into the hopper or chute 50 and caught by the springs 51, after which the cover is pushed in or closed, causing the rolls to turn inwardly, print the ticket, and discharge it into the bottom of the box preparatory to receiving the next ticket.

It will also be understood that each ticket or ballot will be printed differently and registered by the registering mechanism, an alarm being struck on the bell as each ballot is recorded.

It will be obvious that instead of the letters on the printing-disks 1 2 3 4, numbers may be used, if desired; also that the words "Ward" and "Precinct" on the roll O may be substituted by others or omitted entirely; also that said roll may be provided with two or more of the printing-disks, as desired, in accordance with the number of ballots the box is designed to receive.

It will also be obvious that the printing will effectively destroy the ticket and prevent "stuffing" the box or changing the ballots.

Having thus explained our invention, what we claim is—

1. In a ballot-box, the combination of the following instrumentalities, to wit: a cover for opening and closing the box, and a printing mechanism adapted to print each ticket or ballot differently, said mechanism being actuated by said cover, substantially as described.

2. In a ballot-box, the combination of the following instrumentalities, to wit: a cover adapted to open and close the box, a printing mechanism actuated by said cover and adapted to print each ticket or ballot differently, and a chute or hopper for receiving and conveying the ticket or ballot to the printing mechanism, substantially as set forth.

3. In a ballot-box, the combination of the following instrumentalities, to wit: a cover adapted to open and close the box, a printing mechanism adapted to print each ticket or ballot differently, and a registering mechanism for indicating the number of tickets or ballots cast, said printing and registering mechanisms being actuated by said cover, substantially as described.

4. In a ballot-box, the combination of the following instrumentalities, to wit: a cover adapted to open and close the box, a printing mechanism adapted to print each ticket or ballot differently, and means for automatically terminating the printing at the end of each thousand, or other given number of impressions, and commencing anew, substantially as set forth.

5. In a ballot-box, the combination of the following instrumentalities, to wit: a cover adapted to open and close the box, a printing mechanism adapted to print each ticket or ballot differently, a registering mechanism adapted to register the number of ballots cast, and means for automatically terminating the registering at the end of each thousand, or other given number, and beginning the registration anew, substantially as described.

6. In a ballot-box, the combination of the following instrumentalities, to wit: a cover for opening and closing the box, a printing mechanism adapted to print each ticket or ballot differently, a registering mechanism adapted to register the number of ballots or tickets cast, and an alarm mechanism adapted to give an alarm at each deposit of a ticket or ballot, substantially as described.

7. A ballot-box having a cover arranged to slide horizontally, and provided with a rack adapted to engage a gear journaled in the body of the box and through said gear communicate regular reciprocating rotary movements to rolls adapted to print the tickets, substantially as set forth.

8. In a ballot-box, the roll O, provided with the changeable type-disks 1 2 3 4, in combination with the roll Q, the vertical chute 50, means for reciprocating said rolls, means for properly presenting the ticket to the type, and means for changing the type automatically as each ballot is cast, substantially as described.

9. In a ballot-box, the roll O, provided with type adapted to be changed automatically as each ballot is cast, and with type adapted to print a word or words on the ticket to indicate in what ward or other locality the ballot was cast, substantially as set forth.

10. In a ballot-box, the disk 1, provided with the ratchet-wheel 71, holes 76 and 74, and spring push-pin 75, the disks 2 and 3, provided with spring push-pins and holes 76 and 74, the disk 3, provided with the holes 76 and 74, and stud 81, the disk 4, provided with the projections 80 and 82, and holes 76, and the shaft 10, provided with the spring-arm 79, arm 72, and arm 57, in combination with the rolls O Q, means for reciprocating said rolls axially, and means for rocking said shaft and changing said disks, each of which is provided with type adapted to print the ballot or ticket, substantially as described.

11. In a ballot-box, the stops 59 and 58, in combination with the rocker-shaft 10, having the arm 57, and carrying the type-disks 1 2 3 4, substantially as and for the purpose set forth.

12. In a ballot-box, the printing-rolls O Q, ink-roll N, gears L K J, rack I, cover B, and chute 50, substantially as set forth.

13. In a ballot-box, the shaft 10, provided with the spring-arm 79, having a rule-joint, in combination with disk 4, provided with the projection 80, substantially as and for the purpose specified.

14. In a ballot-box, the lever c, in combination with the rolls S T U V, levers a z, and means for connecting and actuating said rolls, substantially as described.

15. In a ballot-box, the pivoted lever l, having the incline n, in combination with the wheel f, rack I, wheel 54, and cover B, substantially as and for the purpose set forth.

WM. H. MUNROE.
TIMOTHY C. SULLIVAN.

Witnesses:
C. A. SHAW,
L. J. WHITE.